(12) United States Patent
Hetzer et al.

(10) Patent No.: US 7,047,221 B1
(45) Date of Patent: May 16, 2006

(54) METHOD FOR PIRACY PROTECTION OF AN APPARATUS AND ARRANGEMENT FOR THE IMPLEMENTATION OF THE METHOD

(75) Inventors: Ulrich Hetzer, Berlin (DE); Wilfried Kopanski, Berlin (DE); Dieter Pauschinger, Berlin (DE); Olaf Turner, Berlin (DE)

(73) Assignee: Francotyp-Postalia AG & Co., Birkenwerder (DE)

( * ) Notice: Subject to any disclaimer, the term of this patent is extended or adjusted under 35 U.S.C. 154(b) by 582 days.

(21) Appl. No.: 09/723,080

(22) Filed: Nov. 27, 2000

(30) Foreign Application Priority Data

Nov. 26, 1999 (DE) .................................. 199 58 946

(51) Int. Cl.
*G06F 17/60* (2006.01)

(52) U.S. Cl. ........................ 705/50; 705/60; 705/61; 705/64

(58) Field of Classification Search ................ 705/39, 705/44, 50, 60–61, 64, 401, 22, 28, 75
See application file for complete search history.

(56) References Cited

U.S. PATENT DOCUMENTS

| | | | |
|---|---|---|---|
| 5,132,729 A | | 7/1992 | Matsushita et al. |
| 5,305,199 A | | 4/1994 | LoBiondo et al. |
| 5,367,148 A | | 11/1994 | Storch et al. |
| 5,786,828 A | * | 7/1998 | Yamamoto .................... 347/19 |

FOREIGN PATENT DOCUMENTS

| | | |
|---|---|---|
| EP | 0 825 564 | 2/1998 |
| GB | 0360225 A2 * | 9/1989 |
| GB | 0782112 A2 * | 2/1997 |
| WO | WO 97/40480 | 10/1997 |
| WO | WO 98/04414 | 2/1998 |

OTHER PUBLICATIONS

Pearce, Stephen and Stukhart, George, "Construction Bar Code Standards", Cost Engineering, Jun. 1989, 31, 6; ABI/INFORM Global p. 19.*

* cited by examiner

*Primary Examiner*—Lalita M. Hamilton
(74) *Attorney, Agent, or Firm*—Schiff Hardin LLP

(57) ABSTRACT

In a method and arrangement for protecting a device against operation with unauthorized consumables a code number range for a device is allocated to a customer number in the memory of a data bank remote from the device. The consumable is aggregated with a generated code number which has a predetermined relationship to a reference code number from a group of reference code numbers that are stored in the device and lie in the aforementioned reference code number range. The allocation is stored in the data bank as a dataset with a customer number, a code number and an identification number of the consumable. In a device remote from the data center, a recognition of the need to change the consumable is recognized, whereupon a message is displayed for entering the code number, the validity and authenticity of the consumable in the device is checked on the basis of the entered code number and the reference code number range. The currently stored reference code number is then made unavailable for further use. The input of the code number can ensue via a chip card.

37 Claims, 3 Drawing Sheets

METHOD FOR PIRACY PROTECTION OF AN APPARATUS AND ARRANGEMENT FOR THE IMPLEMENTATION OF THE METHOD

BACKGROUND OF THE INVENTION

1. Field of the Invention

The present invention is directed to a method for protecting a device against operation with Pirated (unauthorized) consumables, and is also directed to an arrangement for the implementation of the method. The invention can be employed for replenishing consumables in a postage meter machine such as, for example, ink cartridges for ink jet printing units or thermal transfer inking ribbon cassettes or rotary printing drums.

2. Description of the Prior Art

Postage meter machines have been known since the 1920's and are still being constantly perfected. The printing principle has changed from original, purely mechanical solutions with printing drums to electronic solutions with thermal transfer or ink jet printing head. Beginning in the 1970's, microprocessors and electronic credit memories were utilized in the increasingly electronic controllers. A standard payment principle, "pay before", is based on a monetary sum, referred to as the credit amount, being debited from a customer account and administered in the postage meter machine. At every franking, this credit amount is reduced by the franked amount printed on the postal matter. The postage meter machine can be reloaded with a credit amount. At the same time, specific security measures have been developed that are intended to prevent or detect an unauthorized manipulation to the detriment of the manufacturer or the user or the mail carrier. The postage meter machine also uses (consumes) printing ink and the parts belonging to the printing technology wear, so that it is in the interest of the user and of the mail carrier to employ qualitatively high-grade, authorized material of the manufacturer. If, however, so-called pirate products are used, this influences the service life and printing quality of the machine. It is sometimes appropriate, however, for an original product to be recycled by the manufacturer. For example, authorized ink could be refilled into an original cassette for a printing device. Heretofore, however, it has not been possible to completely preclude opportunities for manipulation.

German PS 196 13 944 discloses an ink cassette with two approximately identically constructed ink reservoirs that is suitable for the JetMail® type of postage meter machine. One ink reservoir serves for disposal of ink collected during priming. The other ink reservoir serves for ink supply and in fact has an end of ink detection with two electrodes, but no protection against refilling with an ink not authorized by the manufacturer.

An end of ink detection with electrodes is known from German OS 27 28 283. Two electrodes for a comparative measurement and a separate electrode for a conductivity measurement for signaling the end of ink are introduced into the base of the ink reservoir. The transfer impedance between these electrodes is measured with an electronic circuit and is interpreted. The electrodes are arranged in troughs that are formed in the reservoir base. A pre-condition for the use of such an end of ink recognition is the employment of an electrically conductive ink. Protection against refilling with an ink other than the original ink is not possible.

Sensors for detecting the end of ink already supply the JetMail® system with an end signal—as a safety margin—when a maximum of 200 frankings are still possible in order to avoid an incompletely printed franking imprint, that has already been debited, due to lack of ink. Priming is not possible, however, because the end signal is usually emitted too late to re-order an ink tank.

Cassette-shaped containers with ink fluid, inking ribbon or toner are disclosed in U.S. Pat. No. 5,365,312, which have an integrated circuit chip with an electronic memory for a code identifying the reservoir, for an expiration date and other data, as well as with a counter in order to identify the consumption during printing by counting the individual print pulses. These rules correspond to the drops of ink that are printed out. The integrated circuit stores the current filling status and this can be read out and displayed by the printer controller. Since a reprogramming of the chip and a refilling of the container are not possible, the manufacturer cannot recycle the container.

German PS 196 13 945 discloses a device for preventing re-employment of a container for the ink supply of an ink print head. An ink connecting line from the ink print head is docked to the container with a hollow needle via a rubber-elastic closure. One cover mechanism is irreversibly triggered by the hollow needle when the container is pulled off. A refilled ink reservoir can no longer be docked. Unfortunately, this solution also prevents the re-employment of containers filled with original ink. The used ink tanks only can be returned to the dealer or the manufacturer's service department for proper disposal. It is a disadvantage when even a recycled consumable offered by the manufacturer cannot be re-employed. The use of exactly copied pirated ink reservoirs, unfortunately, can not be avoided with this known arrangement. A distinction between original consumable and unauthorized copies thereof is required for that purpose. A consumable that was not checked by the manufacturer or approved by the manufacturer represents a risk to the legibility of the franking imprint. The franking imprint must be capable of being read visually and by machine by the postal authorities in order to be able to verify the payment of postage. Together with other components of the postage meter machine, the consumables employed must therefore be approved by the postal authorities.

European Application 730 974 discloses a solution specifically for thermal transfer inking ribbons. Markings (for example, a bar code at the start of the inking ribbon) are impressed on the inking ribbon by the manufacturer. A detection of this marking (for example, with an optical scanner) is automatically carried out after the insertion of the inking ribbon into the postage meter machine. The data content of the marking is communicated to the control unit of the postage meter machine and is compared to pre-stored reference codes. These reference codes have been non-volatilely stored in the postage meter machine at the manufacturer. In order to counter revelation of the codes, these codes are regenerated at certain time intervals, and can be rolled into the postage meter machine by remote data transmission from a data center of the manufacturer. Every code supplied by the data center also has a time limit, which prevents unauthorized use after the expiration of the predetermined time period. Counting the imprints is also known.

A disadvantage of the above method is the lack of synchronization between the output of the new codes for the consumables and the storing of the corresponding reference codes in the postage meter machine, and the unpredictable point in time of the purchase and installation of the consumables into the postage meter machine. Time overlaps thus necessarily occur, whereby consumables with old codes do not interact with the new reference codes stored in the postage meter machine. If more than one of the codes is declared valid in these transition times, the risk also increases that codes that have become known can be combined with unauthorized consumables without detection.

Another disadvantage is the lack of information for the manufacturer that a specific customer is attempting to employ unauthorized consumables. This information is acquired only by the postage meter machine, which then can react only in a pre-programmed way, for instance by refusing to frank. A flexible reaction to the customer, for example personal telephone contact on the part of the manufacturer combined with a limited-time permission to use the unauthorized material, is thus not possible.

German 198 38 913 discloses a method for originality testing of a product such as, for example, medications, foods and treats or electronics and software products that delivers a message to the manufacturer as to whether a specific customer is using an authorized or unauthorized product. The latter, however, can neither be rendered more difficult nor prevented. Consequently, a device can be operated with unauthorized consumables without legal consequences and disadvantages, particularly when the manufacturer is not necessarily informed thereof, and thus cannot immediately prevent a potential loss of quality.

Indicating an impending change of consumable via display is disclosed in German OS 195 49 376 wherein sensors are used for determining the remaining amount of inking ribbon on inking ribbon cassettes for a thermal transfer printer or to count the number of imprints with the controller of the thermal transfer printer.

Counting the imprints in piezo ink jet print heads cannot provide any information about the quantity of ink remaining in the ink tank because, given a low through medium number of frankings per day, the consumption of ink due to cleaning predominates, thereby reducing the number of possible imprints per ink tank fill. In piezo ink jet print heads, a large part of the ink is used in priming and cannot be re-supplied to the head. It is also known to resupply the portion of the ink used during priming to the head. For dependable ink supply, it is therefore important to recognize the end of ink and signal this in time. Given a premature replacement or insertion of a refilled but not completely full ink tank, however, the remaining quantity of ink cannot be exactly determined. Whether a replacement has occurred in the interim thus cannot be determined in a simple manner.

SUMMARY OF THE INVENTION

An object of the present invention is to provide a method for piracy protection that is suitable for arbitrary systems and does not need additional hardware outlay. The employment of expired, old consumables as well as those of poor quality from other manufacturers, particularly pirated products, should be largely minimized. The same method should be employable for different consumables regardless of their physical consistency. The method should be employable for machines with as well as without a direct contact to a data center.

The object is achieved in accordance with the invention in a method and a device, particularly a postage meter machine, wherein upon recognizing a necessity of the change of a consumable, a check as to the validity of an input code number associated with the replacement consumable is implemented by a microprocessor.

Piracy protection for consumables in accordance with the invention is based on the a check for authenticity wherein range limits for the code number, that can be modified by the manufacturer, are stored in the device and a size comparison of the code number to the range limits is implemented. The device, for example, is a postage meter machine with an input means for the code number. The manufacturer supplies a code number aggregated to the consumable. If the postage meter machine has a chip card read/write unit available to it, the input of code number, and, possibly, further data, can ensue by a chip card that was supplied with the consumable.

A code area that is reserved for a customer is already produced during manufacture with a software update of the postage meter machine, and reference code numbers are stored in the postage meter machine. At least one first comparison of the input code number to the range limits is implemented in the postage meter machine before the comparison to the listed reference code numbers in order to detect a misuse due to the use of a pirated product, and the postage meter machine reacts to a misuse at least with a signaling. When a new (replacement) consumable is introduced and an appertaining reference code number exists for the entered code number, this reference code number is consumed i.e., it is removed from the memory by deletion, erasing or flagging or other suitable means. An attempted repeated use of the chip card used for the input thus will not be successful. When the user has introduced a new consumable but (mistakenly) inserted a chip card with a consumed code number that was already used earlier, a display is generated and displayed that prompts the user to insert a chip card that authorizes the new consumable. Optionally, a consumption quantity for a postage meter machine that is reduced by a corresponding amount at each and every franking can be stored on a chip card. Given an inking ribbon, for example, predetermined inking ribbon lengths are consumed. The inventive method makes it possible to protect various consumables with the fundamentally same method regardless of their physical nature.

The device has sensors for the direct recognition of statuses, for example a relative motion between a print medium and a printhead, for recognizing the on/off state or for recognizing a downward transgression of a predetermined residual quantity in order to signal the need to change a consumable. The aforementioned sensors are operationally connected to the microprocessor and to a memory of the control unit for the indirect recognition of a further status of the device. The microprocessor of the device is programmed:

to distinguish between a status before and following the change of a consumable, whereby a status before the change signals the need for a change, and whereby the further status signals a change of consumable that has been implemented;

to generate a message for the change of the consumable and display it by display and to wait for the input of a code for which input means are provided;

to check the validity and authenticity of the consumable in the device on the basis of a reference code number range and for consuming the stored reference code number that can be allocated to the input code number; and to store data that are related to the changing of the consumable; as well as to modify the operation of the device if the check of the code number performed in the device has yielded a non-validity result.

Given a misuse with a pirated product, a reaction already can be carried out at the device because of the first comparison in the postage meter machine, even though there is no contact by voice or modem method with the telepostage data center (TDC), or when such a contact is fundamentally not provided. The latter is the case in devices referred to as default postage meter machines, i.e. postage meter machines that must be transported to a post office for the purpose of recrediting.

It is also provided that the postage meter machines recognizes a misuse with a pirated product by identifying discrepancies between the number of the allowable frankings enabled with code numbers and the actual franking performance. At a later point in time, preferably during recrediting, a further evaluation can be implemented in the remote data center given a voice/modem method. As a result, marketing measures can then be initiated in order to counter the misuse with pirated products.

DESCRIPTION OF THE PREFERRED EMBODIMENTS

Figure 1:
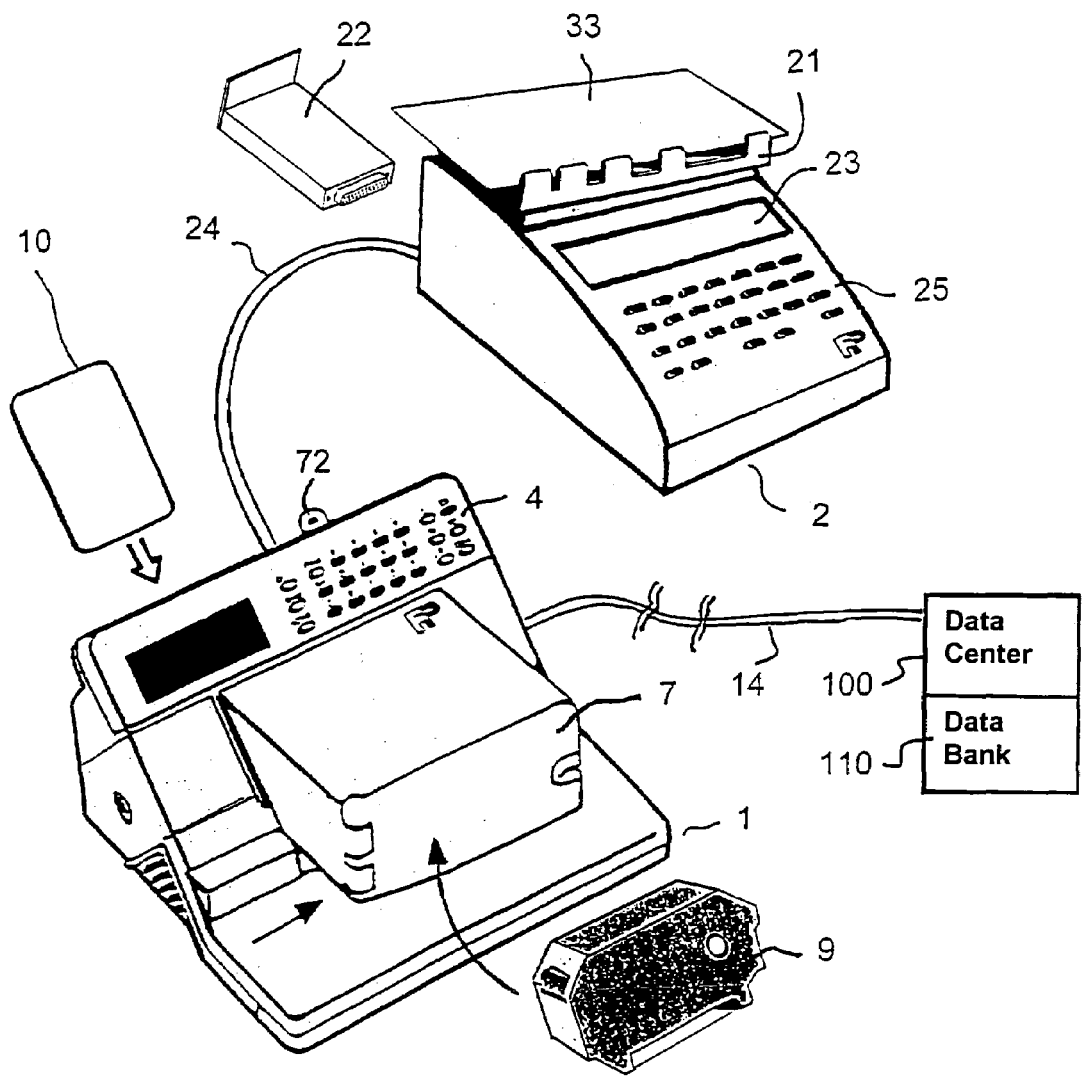
FIG. 1 is a perspective view of a postage meter machine of the type T1000 from the left front, in which the invention can be used.

A perspective view of a postage meter machine of the type T1000 manufactured by Francotyp Postalia AG & Co. is shown from the left front in FIG. 1. The postage meter machine 1 has an internal modem and, for example for recrediting, is connectable via a first data connection 14 to a data center 100 that has a data bank 130. A chip card 10 serves, for example, for setting the postage meter machine to a cost center under which the accounting is to be undertaken. The postage meter machine 1 has a cassette compartment 7 that must be opened for the insertion of a thermal transfer inking ribbon cassette 9. Upon opening before and/or when removing the cassette, which is detected by a sensor (not shown), a microprocessor in the postage meter machine 1 generates a display text and a warning appears on the display of a user interface 4. This text warns against removing a cassette 9 authorized by the manufacturer and continuing the operate the postage meter machine 1 with an unauthorized cassette, in order to prevent damage as well as premature aging of the printer mechanism and a qualitatively compromised print image. A marking is impressed as a bar code at the start of the inking ribbon. After the insertion of the new inking ribbon cassette into the postage meter machine, a detection of this marking is automatically implemented with an optical scanner (not shown) in order to communicate the data content of the marking to the control unit of the postage meter machine, as disclosed in European Application 730 974. Differing from the system disclosed in European Application 730 974, however, a communication is carried out between the control unit of the postage meter machine 1 and the data center 100, an authentic manufacturer's inking ribbon being recognized in the data center as a result thereof and the microprocessor being initiated therefrom to either display an OK message, or to emit an error message (CALL SERVICE) if the data center was incapable of recognizing an authentic manufacturer's inking ribbon.

Other physical identifiers can be alternatively employed, for example given a device without a chip card write/read unit. For example, it is then possible to glue on a bar code label with the code number that can be visually read and manually entered via the user interface 4. The consumable also can be aggregated with this code number in other different ways.

In order to be able to protect the greatest variety of consumables at the device operated by the user with the same method regardless of the physical nature thereof, the manufacturer of the device or of the consumable generates at least one code number that authorizes the consumable. The allocation of the code number to a specific consumable is stored in a data bank in the form of a dataset with the generated code number and device identification number. An aggregation of the consumable with the generated code word ensues at the manufacturer in that a code number, preferably in the form of a chip card, is attached to a consumable offered for sale or is permanently allocated thereto by comparable measures. One such measure can be marking the consumable with this code number, which can ensue in very different ways with physical or chemical measures dependent on the physical consistency of the consumable. This marker code number has a predetermined relationship to a reference code number or to a group of reference code numbers that are stored in the data bank 110 in the data center 100 of the manufacturer allocated to the customer address. A loading of the code number aggregated to the consumable, for example by chip card, ensues after recognition of a need to change a consumable in a device, for example a postage meter machine, remote from the data center. When there is agreement with the reference code number, for example, the authenticity can be checked by a comparison operation in the simplest case. The device is fashioned for the loading of a new group of reference code numbers lying in the range. A transmission of reference code words from the data center 100 to the device (the postage meter machine) such as to a specific evaluation hardware/software therefor, ensues on demand.

Figure 2:
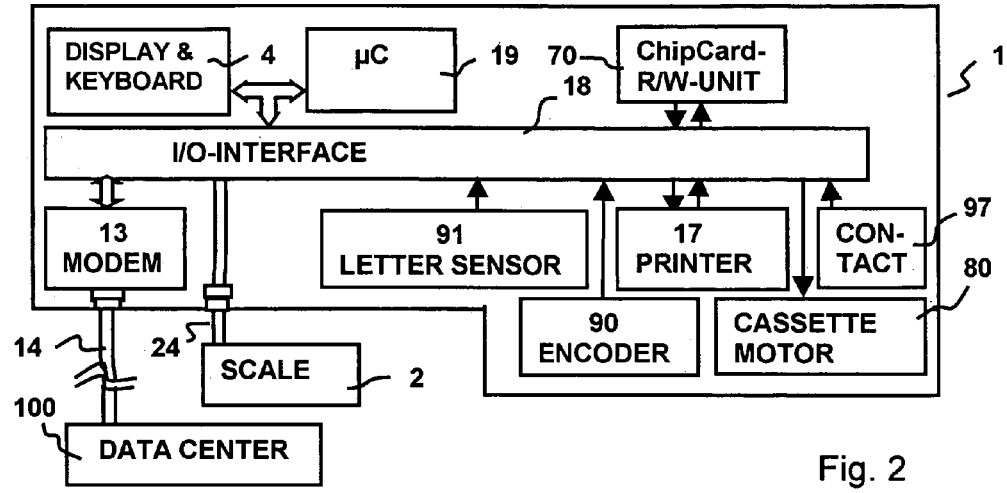
FIG. 2 is a block circuit diagram of the postage meter machine according to FIG. 1.

A block circuit diagram is explained on the basis of FIG. 2, which applies to the postage meter machine 1 shown in FIG. 1 or to some other, arbitrary device. Such a device has a microcomputer (µP) 19 for the control of the user interface 4, a modem 13, a chip card write/read unit 70 and a printer 17 with a cassette motor 80 and/or other actuators (not shown) that are connected to the microcomputer 19 via an input/output interface 18. Further sensors such as an encoder 90, a letter sensor 91 and a contact 97 are also connected in a known way.

The printer 17 interacts with a cassette and—in a standard way—has a print head and its own sensors and actuators or a further motor, which need not be shown in greater detail in FIG. 2. In a known way, the user interface 4 comprises a keyboard and a display with controller, which likewise need not be shown in greater detail in FIG. 2.

When the aforementioned device is a postage meter machine 1, a postage-calculating scale 2 can be connected to the input/output interface 18 via a cable 24 for data connection. A further data connection 14 serves for the connection of the modem 13 to the data center 100 for the purpose of credit reloading.

The allocation of a specific code number range to a specific customer address is fixed for a time span, i.e. is not variable and is kept secret. There is a reference code number for each code number. When a code number is entered by a chip card, i.e. not manually via user interface 4, the code number remains unknown to the user. There is thus high security against impermissibly learning the code number range. Moreover, known encryption methods (DES, RSA, etc.) can be utilized for secrecy. The reference code numbers are stored in a consumable manner and protected against readout in the non-volatile memory of the postage meter machine. During manufacture, a device identification number (GIN) is allocated to the postage meter machine. The server of a data bank 110 of a data center 100 is programmed to define a unique code number range and to allocate it to the device ID number GIN in the memory of the data bank 110. Storage of reference code numbers of the set B' in the memory of the device with the device ID number ensues during manufacture of the postage meter machine, whereby a specific code number that the customer obtains via chip card is respectively allocated to a reference code number. A provision of a code number range for each customer ensues in the memory of the data bank 110, i.e. a customer address in a central customer master file has a set B of code numbers allocated to it that lies within a code number range. A generation of a code number that lies within the numerical code range also ensues with a server of the data center 100 according to the random principle. An aggregation of the random code number and an item count S of imprints/frankings to the consumable of a predetermined type can ensue by storing corresponding data in a chip card that is co-supplied. Supplying the consumable is connected to the request to enter the random number co-supplied with the consumable by chip or, alternatively, to read it and enter it into the device with the user interface 4. An input with the chip card has the advantage that, in addition to the code number, an identification number of the consumable and a number of quantities, for example an item count S, for use during operation of the device also can be effortlessly entered. The recognition of the need to replace a consumable is based on a consumed item count/number of quantities during operation of the device and on the storage of the aforementioned data such as, for example, the item count S in the device, these being related to the depletion of the consumable. A generation of a corresponding display in the device to enter a code number ensues after a predetermined consumption <S. When, however, the consumption is >S, then a status following a replacement of the consumable is recognized, however, no code number was entered. For example, use of a pirated cassette can then be suspected.

The printer 17 of a thermal transfer machine includes at least one controllable motor. The latter drives a counter-pressure roller for the letter transport that effects the relative motion between the letter and the printhead that is identified with an encoder. The take-up reel of the cassette of the type T1000 postage meter machine is driven by a cassette motor. The speed of the inking ribbon is limited due to the adhesion of the thermal transfer inking ribbon when pressed against the envelope surface. So that a proper take-up is possible, the aforementioned relative motion has a speed that is lower than the speed of the inking ribbon during take-up. The T1000 has a specific cassette/encoder arrangement that can be used for an indirect measurement. With a cassette inserted, the inking ribbon is brought into engagement with the encoder 90 via a cassette window. Since the encoder 90 only outputs its pulses to the microcomputer controller 19 given an inking ribbon transported within a cassette, the presence of an inking ribbon cassette can be indirectly determined by the microcomputer controller 19, i.e. without an additional sensor. Up to now, the printer 17 was only driven when a letter sensor 91 found a letter in the transport path. Now, the cassette motor of the printer 17 should also be driven at time intervals in the printing pauses, whereby the inking ribbon is only transported a fraction of a millimeter. It is entirely adequate for this purpose to drive the cassette motor of the printer 17 for such a short time that only the take-up reel of the cassette is moved, whereby the encoder 90 outputs at least one pulse in order to detect the presence of an inking ribbon cassette.

The device detects and stores the number of frankings when an event is found that allows conclusions regarding the replacement of the consumable. In addition to a lack of encoder pulses, a re-activation after a shutdown of the postage meter machine 1 should also be interpreted as such an event. The latter is communicated to the microcomputer 19 by a contact 97 via the I/O interface 18 when a key switch 72 (shown in FIG. 1) for turning the machine on is actuated. The microcomputer 19 determines the number of frankings up to the event; when the event coincides with a predetermined number for which the original cassette is designed, a generated request to change the cassette appears in the display. The microcomputer 19 can generate a display that the user must reply to with an input. The user can enter a code number. During the check in the postage meter machine, an entered code number is first checked by the microcomputer 19 to determine whether it lies in the code number range. A consumption then ensues by striking the just-used reference code number from the original set B when the entered code number corresponding thereto was found to be in the reference code range. A reduction in the number of reference code numbers to the set B-1 thus occurs. The item count of imprints/frankings is stored during the operation of the device. Since the code number range is finite, possibilities are provided:

to reload a code number range when the code number range has been consumed; or to reload a new group of reference code numbers when the reference code numbers of the reference code number range have been consumed by the device.

If, however, the user does not enter a code number, the number of frankings continues to be counted up to the event. The events and the number are stored in the internal memory of the microcomputer 19. The microprocessor of the postage meter machine recognizes an unauthorized replacement via the incongruity between the plurality of allowable frankings input with the code number and the actual franking performance and supplies data for the data transmission to the data center 100, particularly:

for a data communication to the telepostage data center (as the data center 100) at the next modem call. The data communication automatically ensues with code by modem. The codes contain an encrypted information about the aforementioned incongruity. The forwarding of the number of actual frankings to the telepostage data center makes a any misuse apparent since the number of enabled frankings would be clearly elevated in case thereof;

for a data transmission to the telepostage data center by telephone given a voice postage meter machine, a display of number code is generated that contains the encrypted information about the incongruity and that are communicated to the telepostage data center by telephone during the next credit reloading event. Given a misuse, the number of actual frankings stored in the postage meter machine would again be clearly inflated, which can be read from the register readings that enter into the communicated number code;

for a data communication from postal officials, from the user of the postage meter machine or a party authorized for such use, potentially by the manufacturer's service technician to the telepostage data center according to the aforementioned manufacturer transmission methods.

When the data center 100 is a telepostage data center, the data transmission can ensue in conjunction with a credit reloading. When the consumable is a cassette, then a possibility is optionally provided for checking in the remote data center 100 as to whether the item count of imprints/frankings is plausible relative to the number of the cassette change since the last reloading. On the basis of this information from the data center 100, the manufacturer of the postage meter machine can be caused to react flexibly to the customer behavior. A service technician can be dispatched to check the customer machine or the customer can be offered inking ribbon cassettes at a more favorable price in order to modify the customer's future behavior. Even if the device is neither disabled nor disconnected when the code number does not lie in the code number range, the device could, however, at least be prompted to operate slower and slower in the future the more frequently the customer uses outside products for the change. In a thermal transfer printing machine operating slowly, an inferior inking ribbon can still produce an adequate print quality. The postage meter machine can automatically switch into a slower operating mode, or can be set slower by a service technician, or can be remotely set from the data center. Further, the postage meter machine should only display an error after a predetermined number of unauthorized cassettes have been inserted, this prompting the customer to look at the operating manual or to call a service technician who, for example, can explain to the customer that unauthorized products would cause the device to wear faster. The service technician could even explain that the postage meter machine runs faster with the manufacturer's original cassettes. At any rate, the customer should not be forced to completely forego outside cassettes; but the customer should be urged to reach this conclusion willingly.

An advantage of this solution is the lack of downstream compatibility with the devices (postage meter machines) already in the field at customer sites. The manufacturer need not perform a hardware intervention, as would be required given an additional sensor according to U.S. Pat. No. 5,949,467. A software update, in contrast, can be facilitated by a favorable offer to the customer, offering the method in combination with a price reduction for the consumable. The price of the inking ribbon cassettes thus can be lowered for this customer. These inking ribbon cassettes carry number labels, and the customer thus buys the number of frankings. These inking ribbon cassettes are only delivered to the customers who participate in the new method. The old customer who would also like to use the more economical inking ribbon cassettes in future needs a (cost-free) software update for this, for example during the next technician visit.

Figures 3, 4:
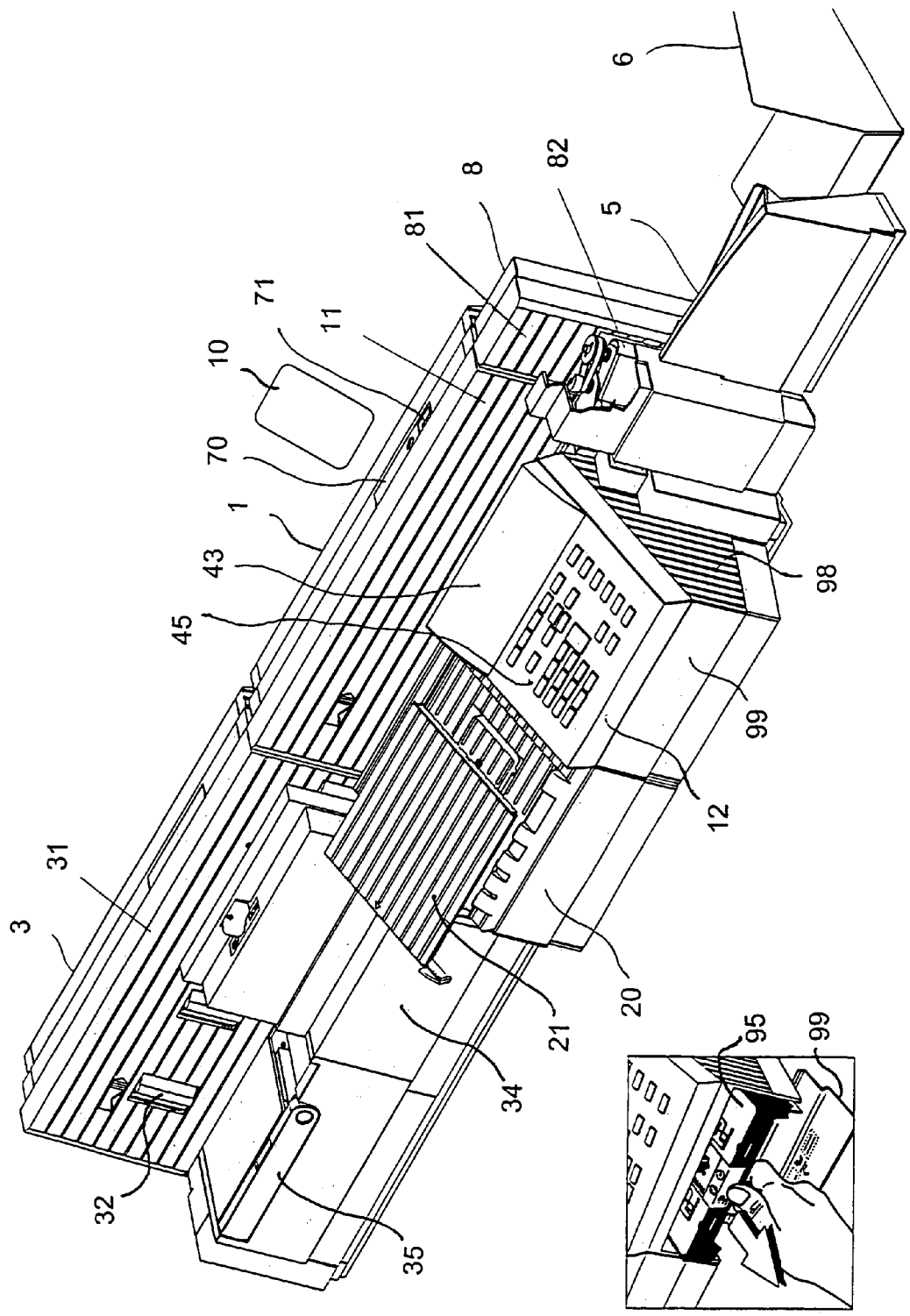
FIG. 3 is a perspective view of a postage meter machine of the type JetMail® from the right front in which the invention can be used.
FIG. 4 illustrates of changing of the ink tank in the postage meter machine of the type JetMail® in accordance with the invention.

In the postage meter machine according to FIG. 3 the consumable is an ink tank filled with ink. For a different postage meter machine (not shown) the consumable can be an ink jet print head or a cartridge. The ink jet print head, which has an integrated ink cartridge is thereby likewise referred to as Acartridge@. For example, Siemens type DHP50 is such a disposable print head.

For a peripheral device the consumable can be a liquid, for example water for a letter moistener and letter sealer. The latter can be a component of an automatic feeder for letters.

Fundamentally, the inventive solution can be applied in postage meter machines of some other type, for example in a postage meter machine with print drum. The consumable can be ink for such a postage meter machine (not shown) having a printing drum. After a cover has been opened, ink can be replenished from a bottle or an ink cartridge. The code number is printed on the bottle or ink cartridge or is printed on a label that is secured to the latter. A postage meter machine Type EFS with a printing drum of Francotyp-Postalia AG & Co. has an inking unit with a step-shaped covering that enables a simple refilling of the print stamp ink and prevents an unintended emergence of the print stamp ink (European Application 269 883). The printing ink flows from a screwed-on cartridge into an ink chamber and is conveyed to the printing drum with rollers. In an especially simple version the code number is supplied together with the consumable as a visually legible number, and the user must type in the number by actuating corresponding operating elements. The advantage of a semi-automatic solution is a) elimination of the outlay for a scanner in the postage meter machine, b) protection of the consumable, ink, enabled for the first time as a result.

This solution likewise assumes the counting of the frankings or printing events, possibly in a functional combination with an end of ink sensor. The postage meter machine has a control unit with a processor that is programmed to generate a message after such a recognition, and to display on a display and to wait for the entry of the number that is in relationship to the reference code number, as the code number.

Another version employs a chip in which the code number is stored and can be read out by producing electrical contacts given installation of the new consumable.

A postage-calculating scale 2 (shown in FIG. 1) has a weighing pan 21, a display 23 and a keyboard 25 for the entry of shipping information about a letter 33 to be dispatched. When there is a further data connection 24 between the postage-calculating scale 2 and the postage meter machine 1, the scale 2 can send the weight, the postage value and other data to the postage meter machine 1, and can also send a message to the remote data center 100 via the modem of the postage meter machine 1, for example to identify which rate PROM is being employed for calculating the postage value. The latter is located within a memory insert card 22 that can be plugged in the postage-calculating scale 2. On the basis of data stored in a data bank 110, the data center 100 can distinguish whether an authorized or a non-authorized postage rate table is being employed in the postage-calculating scale 2.

In the perspective view from the right of a JetMail® type postage meter machine shown in FIG. 3, there is an internal data connection to the integrated scale 20. In a known way, the scale 20 has a weighing pan 21 and a weighing cell (not shown) connected to evaluation electronics. A postage computer can be provided as a component of the scale 20, but in the exemplary embodiment herein is shown as a component of the meter 12. A rate PROM memory arrangement, required for calculating postage, can be a component of the meter or of the base or of the postage meter machine 1. The rate PROM can be provided at any of those locations in a modular, removable form. The weighed letters are individually applied standing on edge upstream of the postage meter machine 1. Alternatively, a stack of letters each having a weight within a common weight category for postage calculation can be supplied upstream of the postage meter machine 1.

An automatic feeder 3 with integrated separating mechanism is arranged upstream of the postage meter machine 1. A pressure bow 35 can be hinged up and then presses against a stack of mail from which letters are separated with haul-off rollers 32. Further parts of the separating mechanism is situated under a hood 34. A letter lies against a guide plate 31 and is moved downstream to the guide plate 11 of the postage meter machine 1 where the printing event franking ensues. A franked letter that is conveyed farther lies against a guide plate 81 of a closing module 8. A closing roller pair 82 closes envelopes that have not yet been completely closed and ejects the envelopes via an insert 5 into the deposit box 6. The structure of the JetMail® type postage meter machine has been disclosed in greater detail in, for example, German Patent Application DE 199 00 686.5-27.

A chip card write/read unit 70 and an on/off switch 71 are arranged in the guide plate 11 of the postage meter machine 1. After being turned on, a chip card 10 can be employed in combination with the user interface 43, 45 for simplified setting of the postage meter machine. The user interface 43, 45 is situated on the meter 12 of the postage meter machine 1. An internationally usable user interface has been set forth in greater detail in German Utility Model 298 21 903.

A microprocessor (not shown) of the postage meter machine 1 monitors the filling level of an ink tank 95 (shown in FIG. 4) with an end of ink sensor 92. The latter can be in contact with two electrodes according to German Patent 196 13 944. In the JetMail®, such sensors—to be on the safe side—already supply an end signal when a maximum of 200 frankings are still possible in order to avoid an incompletely printed franking print image due to lack of ink. The necessity of soon making a change of the consumable thus can be recognized. The user, within a range of 200 frankings, then can again insert the chip card 10, which is supplied together with the consumable, into the slot of the chip card write/read unit 70, and the microprocessor in the postage meter machine 1 can then respond appropriately to this replacement event. If the postage meter machine 1 is switched off within the aforementioned range of 200 frankings by the main power switch, which can be detected by a contact 71, evaluation of the replacement event can be indirectly made if the number of remaining frankings does not significantly exceed the number 200 when power is again turned on. As warranted, the microprocessor generates a display text for display in the display 43: THE INK SUPPLY HAS BEEN NEARLY USED UP. PLEASE REPLACE THE INK TANK AS SOON AS POSSIBLE! IMPRINT RESERVE: 200.

The postage meter machine 1 then can continue to be operated with the quantity of reserve ink. In its memory space, the microprocessor has a down counter that is preset to the number 200 by the end of ink signal and that is decremented by one upon every further franking. The number 200 is derived empirically from values for a remainder of possible imprints and a safety factor. The number identifying the remainder can be displayed before the next franking. After every further franking, the microprocessor generates a status line that indicates the number of remaining imprints and, at the end, outputs the message: THE INK SUPPLY HAS BEEN USED UP. PLEASE CHANGE THE INK TANK.

After opening the flap 99 of the ink compartment 98, the used ink tank 95 can be removed and placed into a plastic bag that collects ink residues that may leak out. A new ink tank can be taken from its package and checked to see whether the color of the ink is right. A perforation encoding on the back side of the ink tank can be utilized for this purpose. The new code word can be read at the same time.

The ink tank is placed into lateral guide rails (not shown) of the ink tank compartment and pushed in until it noticeably engages. As long as the ink tank has not been properly inserted, the microprocessor generates the message: THE INK TANK IS MISSING!

The contact via the electrodes 93 and 94 of the ink tank cassette 95 with an existing sensor is automatically closed when the new ink tank cassette 95 filled with conductive ink is docked. As a result of this contact, the postage meter machine recognizes that an ink tank cassette 95 has been installed as new consumable. Dependent on a perforation encoding at the back side of the ink tank cassette 95, the original ink type (postal red, fluorescent red, etc.) can be detected with suitably fashioned, further contacts (not shown). The microprocessor now generates a messages that prompts the customer via the display to either again replace the ink tank cassette with one having an allowed color or to input the new code number: INPUT CODE NUMBER. For example, the customer can input this code number with a co-supplied chip card 10 or, alternatively, can take it from an imprint on the package and can input it into the postage meter machine 1 with the keyboard 45. When the input code number lies outside the valid range, the microprocessor generates a message: INPUT VALID CODE NUMBER.

Now that the postage meter machine 1 has the new code word available to it, a connection is set up to the data center of the manufacturer. Modern postage meter machines are all already equipped with a modem in order to be able to communicate with the manufacturer's data center. This normally serves for having a credit loaded from the data center when the credit memory becomes exhausted. The transmission of the code words can ensue separately immediately after the detection of the new consumable or can be an additional component of the communication for the periodic remote crediting of the postage meter machine at a later time. Known measures for data protection are utilized in order to prevent the code words from being tapped on the transmission link. The data center receives the code word of the new consumable 95 together with an identifier of the postage meter machine 1. The matching code word is sought in the group of stored reference code words. When it is found, the logged-on consumable is considered authorized and nothing opposes continued employment of the postage meter machine 1. If the code word is not identified, a counterfeit code word or a code word that is no longer valid must be assumed. Given a counterfeit code word, the customer has obviously acquired a non-authorized consumable with an arbitrary, pseudo code word, or created the code word due to a lack of a true code word when requested to enter the code word. Given a code word that is no longer valid, a check is carried out to see whether this was already employed. When the answer is 'no', this can mean an authorized but expired consumable. In this case, a check should be carried out to determine whether the material can still be permitted to be used. When the invalid code word has already been employed, it is obviously an attempted manipulation.

Figure 5:
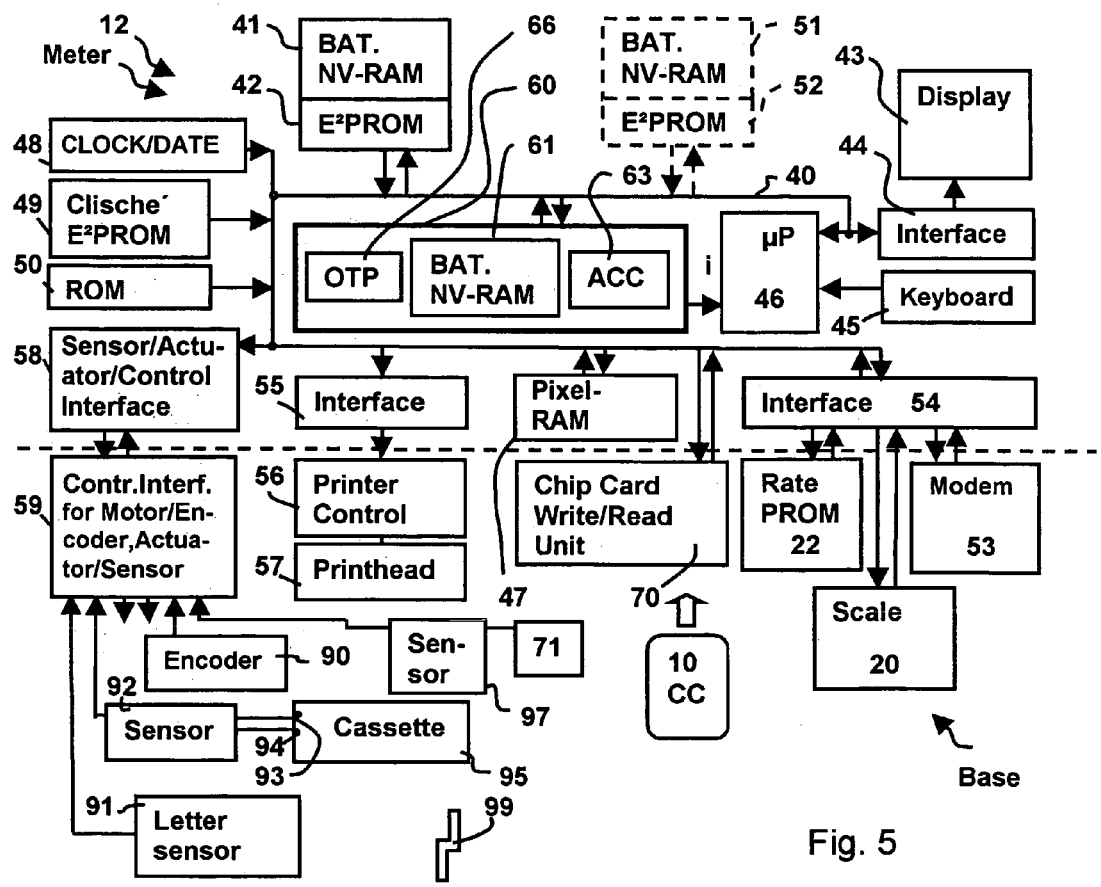
FIG. 5 is a block circuit diagram of the postage meter machine of the type JetMail®.

FIG. 5 shows a block circuit diagram of the JetMail® type postage meter machine with a control unit 40 through 58 comprising a processor 46 and with a base including an integrated scale 20, a rate PROM 22, a modem 53 and an end of ink sensor 92 that detects a need to replace the ink tank cassette 95. After a consumption of the ink, an end of ink is detected with the electrodes 93, 94 and the sensor 92 and communicated to the microprocessor 46 via the assemblies SAS 59, sensor/actuator control interface ASIC 58, the microprocessor 46 subsequently generating a display. A predetermined remainder of ink remains that suffices for approximately 200 imprints when the conductivity between the contacts 93, 94 falls below a predetermined threshold. A turn-on/off of the postage meter machine 1 via the switch 71 can be detected via the sensor 97, which is likewise connected to the SAS 59. When, following a re-activation without a replacement detected via the contacts 93, 94 and the sensor 92 for restored conductivity between the contacts 93, 94, the postage meter machine can continue to be operated beyond a number of, for example, 200 imprints, then this is an indication that ink was refilled in an unauthorized fashion in the interim. As a reaction thereto, at least a display message is generated and a message also may be communicated to the date center when a credit must be reloaded.

A security module 60 serves as first accounting module and has a hardware accounting unit 63 and a battery-supported non-volatile memory 16 into which a credit can be loaded by modem 53. An OTP (One-time programmable) processor 66 thereby implements security routines both in the credit reloading as well as for securing the register data with a MAC (Message authentication code). The advantage of the security module therein that the check of the dependability and the approval of the inventive franking and posting machine, which is carried out by the mail carrier, is then only required for the appertaining processor system 60 and the connected printer module 55–57. A second processing module is formed by the chip card 10 in combination with the chip card write/read unit 70. The microprocessor 46 and the first memory components 41, 42 then form a third processing module, and the microprocessor 46 and the second memory components 51, 52) broken lines) then form a fourth processing module, etc. As a rule, one accounting module suffices and the other processing modules can assume other tasks. The individual steps of the method for protection against piracy can, for example, be processed in the third processing module.

The microprocessor 46 with the appertaining memories 41, 42 is programmed for counting the imprints in combination with the recognition of a change of the ink cassette and is also employed as postage computer and for the print control. The accounting module 60 serves for accounting and for calculating encryption codes at least for the communication with the data center for the purpose of credit reloading. The accounting module 60 has been developed to form the security module on the basis of this division of tasks. All processing modules 41, 42 and 51, 52, the security module 60, the microprocessor 46, the interface assemblies 44, 54 and 55, a main working memory pixel-RAM 47, clock/date module 48, slogan memory EEPROM 49, program memory ROM 50 and an ASIC with the sensor/actuator interface 58 are connected to a meter-internal bus 40 of the controller. An input at the ports of the microprocessor 46 for the corresponding control of the postage meter machine 1 is actuated with the keyboard 45. A generated screen image can proceed to the display via the interface assembly 44. The display has an integrated controller for support.

Further sensors and actuators (not explained in greater detail herein) of the base, an encoder 90 and at least one letter sensor 91 as well as—via the interface 54—at least the modem 53 are electrically connected to the meter 12 of the postage meter machine 1 via the sensor/actuator control interface 58. Both interface circuits 54 and 58 can be realized in an application circuit ASIC. Further details about this can be derived from European Application 716 398.

Further details about the control of the other components in the base and in the periphery can be derived from European Application 875 864.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for protecting a device against operation with unauthorized consumables, comprising the steps of:
    (a) generating a device identification number and uniquely allocating said device identification number to a device;
    (b) generating a code number range, containing a plurality of code numbers, and allocating said code number range to said device identification number;
    (c) generating a reference code number range, containing a plurality of reference code numbers respectively having relationships to the respective code numbers in said code number range;
    (d) storing said device identification number and said reference code number range in said device;
    (e) aggregating a code number in said code number range with a replacement consumable;
    (f) recognizing a need to replace a depleted consumable in said device;
    (g) before substituting said replacement consumable for said depleted consumable in said device, authenticating said replacement consumable by entering said code number aggregated with said replacement consumable into said device and, in said device, obtaining an authentication result by checking whether said code number aggregated with said replacement consumable has said relationship to one of said reference code numbers in said reference code number range stored in said device and, if so, consuming said one of said reference code numbers in said device by permanently deleting said one of said reference code numbers from said device; and
    (h) controlling said device dependent on said authentication result.

2. A method as claimed in claim 1 wherein step (h) comprises allowing substitution of said depleted consumable with said replacement consumable if said code number aggregated with said replacement consumable has said relationship to one of said reference code numbers in said reference code number range stored in said device.

3. A method as claimed in claim 1 comprising disallowing operation of said device with said replacement consumable if said code number aggregated with said replacement consumable does not have said relationship to one of said reference code numbers in said reference code number range stored in said device.

4. A method as claimed in claim 1 wherein step (h) comprises allowing operation of said device in a modified manner with said replacement consumable if said code number aggregated with said replacement consumable does not have said relationship to one of said reference code numbers in said reference code number range stored in said device.

5. A method as claimed in claim 1 comprising the additional steps of:
    storing the allocation of the device identification number to said code number range in a data bank at a data center remote from said device;

storing the code number aggregated with said replacement consumable in said data bank associated with said code number range and said device identification number allocated thereto; and upon each recognition of a need to replace a depleted consumable in said device, and if said code number has not been entered into said device, establishing a communication between said device and said remote data center to inform said remote data center of said need to replace said depleted consumable, and monitoring usage of the consumable represented by said depleted consumable at said remote data center.

6. A method as claimed in claim 5 comprising accumulating data in said device related to usage of said depleted consumable and, after establishing communication between said device and said remote data center, transmitting said data from said device to said remote data center for use in said monitoring.

7. A method as claimed in claim 6 wherein said data include an indication if and when all of said reference code numbers in said reference code range stored in said device have been consumed.

8. A method as claimed in claim 7 comprising the additional step of, upon receiving said indication at said remote data center, transmitting a new reference code number range from said remote data center to said device and reloading said new reference code number range into said device.

9. A method as claimed in claim 7 comprising the additional step of, upon receipt of said indication at said remote data center, transmitting a new group of reference code numbers from said remote data center to said device and reloading said new group of reference code numbers into said device.

10. A method as claimed in claim 7 comprising the additional step of, upon receipt of said indication at said remote data center, producing a chip card having a new group of reference code numbers stored therein, physically transporting said chip card to said device, and inserting said chip card into a chip card reader at said device to load said new group of reference code numbers into said device.

11. A method as claimed in claim 1 wherein step (e) comprises aggregating said code number with said replacement consumable by storing said code number in a chip card and physically associating said chip card with said replacement consumable.

12. A method as claimed in claim 11 comprising additionally storing in said chip card a plurality of quantities related to usage of said replacement consumable during operation of said device.

13. A method as claimed in claim 1 wherein said device has a user interface, and wherein step (g) comprises entering said code number aggregated with said replacement consumable into said device via said user interface.

14. A method as claimed in claim 13 wherein step (e) comprises permanently affixing said code number to said replacement consumable in a manner allowing said code number to be identified for entry into said device via said user interface.

15. A method as claimed in claim 14 comprising affixing said code word to said replacement consumable dependent on a physical nature of said replacement consumable.

16. A method as claimed in claim 1 wherein step (f) comprises monitoring consumption of said consumable in said device by indirectly measuring usage of said consumable, to determine when said consumable is depleted.

17. A method as claimed in claim 1 comprising conducting step (b) at a manufacturer of said replacement consumable, and wherein step (e) comprises aggregating said code number in said code number range with said replacement consumable during manufacture of said replacement consumable.

18. In a device which consumes a consumable during operation thereof, the improvement of an arrangement for protecting said device against operation with an unallowed consumable, said arrangement comprising:

at least one sensor for monitoring usage of a consumable in a device, said sensor emitting a sensor signal;

a microprocessor in said device supplied with said sensor signal and identifying a need for replacement of said consumable before actual replacement of said consumable is necessary;

a display connected to said microprocessor, said microprocessor generating a message on said display indicating said need for replacing said consumable;

a memory accessible by said microprocessor in which a reference code number range is stored, said reference code number range containing a plurality of reference code numbers respectively having relationships to code numbers representing an authorized replacement consumable;

an input unit connected to said microprocessor, said microprocessor, upon generating said message, waiting for entry, via said input unit, of a code number and, upon entry of said code number via said input unit, said microprocessor producing an authentication result dependent on whether said code number has said relationship to one of said reference code numbers in said memory and, if so, causing said one of said reference code numbers to be consumed by permanently deleting said one of said one reference code numbers from said memory; and said microprocessor controlling operation of said device dependent on said authentication result.

19. An arrangement as claimed in claim 18 wherein said device is a printing device having an inking ribbon in a cassette, as said consumable, and wherein said sensor comprises an encoder which interacts with said cassette.

20. An arrangement as claimed in claim 18 wherein said sensor comprises a sensor for physically interacting with said consumable.

21. An arrangement as claimed in claim 20 wherein said device comprises a printing device having an interchangeable ink tank cassette containing electrically conductive ink as said consumable, and wherein said sensor comprises electrical contacts interacting with said electrically-conductive ink to identify an amount of said electrically conductive ink in said ink tank cassette.

22. An arrangement as claimed in claim 18 wherein said device comprises a printing device having an ink jet print head with an integrated ink tank containing ink, said ink comprising said consumable.

23. An arrangement as claimed in claim 22 wherein said microprocessor generates a message for display on said display if said authentication result indicates an unauthorized replacement.

24. An arrangement as claimed in claim 18 wherein said device comprises a device which consumes a liquid as said consumable, said liquid being packaged in packaging material having an identifier thereon usable as said code number.

25. An arrangement as claimed in claim 18 wherein said device consumes a non-solid aggregate state consumable.

26. An arrangement as claimed in claim 18 wherein said device consumes a solid consumable.

27. An apparatus as claimed in claim 18 wherein said device is a postage meter machine having a printer which produces a plurality of franking imprints, thereby consuming said consumable, and wherein said microprocessor monitors a number of said franking imprints which occur between each replacement of said consumable, and wherein said microprocessor uses said number of franking imprints as a basis for producing said authentication result.

28. An arrangement as claimed in claim 27 wherein said microprocessor establishes a communication to a remote location, dependent on said authentication result, upon triggering by an entry via said user interface.

29. An arrangement as claimed in claim 27 wherein said device has a modem connected thereto, and wherein said microprocessor automatically establishes said communication to a remote location, dependent on said authentication result, via said modem.

30. An arrangement as claimed in claim 27 wherein said device has a chip card reader connected to said microprocessor, said chip card reader receiving a chip card therein, and wherein said microprocessor establishes a communication to a remote location, dependent on said authentication result, upon insertion of said chip card into said chip card reader.

31. An arrangement as claimed in claim 27 wherein said postage meter machine requires periodic credit reloading, and wherein said microprocessor establishes a communication to a remote location in conjunction with a credit reloading and reports said authentication result in said communication.

32. A method for protecting a device against operation with unauthorized consumables, comprising the steps of:
(a) generating a device identification number and uniquely allocating said device identification number to a device;
(b) generating a code number range, containing a plurality of code numbers, and allocating said code number range to said device identification number;
(c) generating a reference code number range, containing a plurality of reference code numbers respectively having relationships to the respective code numbers in said code number range;
(d) storing said device identification number and said reference code number range in said device;
(e) aggregating a code number in said code number range with a replacement consumable;
(f) operating said device through a plurality of cycles with a consumable in said device that is incrementally depleted in each cycle, and recognizing a need to replace said consumable, as a depleted consumable, in said device by generating and storing a running count of an item associated with said incremental depletion over said plurality of cycles, and indicating a need to replace said consumable when said running count reaches a predetermined level;
(g) before substituting said replacement consumable for said depleted consumable in said device, authenticating said replacement consumable by entering said code number aggregated with said replacement consumable into said device and, in said device, obtaining an authentication result by checking whether said code number aggregated with said replacement consumable has said relationship to one of said reference code numbers in said reference code number range stored in said device and, if so, consuming said one of said reference code numbers in said device by permanently deleting said one of said reference code numbers from said device; and
(h) controlling said device dependent on said authentication result.

33. A method as claimed in claim 32 wherein said device is a printer for printing franking imprints and wherein said item count is a number of said franking imprints.

34. A method for protecting a device against operation with unauthorized consumables, comprising the steps of:
(a) generating a device identification number and uniquely allocating said device identification number to a device;
(b) generating a code number range, containing a plurality of code numbers, and allocating said code number range to said device identification number;
(c) generating a reference code number range, containing a plurality of reference code numbers respectively having relationships to the respective code numbers in said code number range;
(d) storing said device identification number and said reference code number range in said device;
(e) aggregating a code number in said code number range with a replacement consumable;
(f) recognizing a need to replace a depleted consumable in said device;
(g) before substituting said replacement consumable for said depleted consumable in said device, authenticating said replacement consumable by entering said code number aggregated with said replacement consumable into said device and, in said device, obtaining an authentication result by checking whether said code number aggregated with said replacement consumable has said relationship to one of said reference code numbers in said reference code number range stored in said device and, if so, consuming said one of said reference code numbers in said device by permanently deleting said one of said reference code numbers from the reference code number range stored in said device; and
(h) controlling said device dependent on said authentication result.

35. A method for protecting a device against operation with unauthorized consumables, comprising the steps of:
(a) generating a device identification number and uniquely allocating said device identification number to a device;
(b) generating a code number range, containing a plurality of code numbers, and allocating said code number range to said device identification number;
(c) generating a reference code number range, containing a plurality of reference code numbers respectively having relationships to the respective code numbers in said code number range;
(d) storing said device identification number and said reference code number range in said device;
(e) aggregating a code number in said code number range with a replacement consumable;
(f) determining a presence of a consumable in said device by detecting an occurrence of an event associated with depletion of said consumable;
(g) recognizing a need to replace said consumable, as a depleted consumable, in said device;
(h) before substituting said replacement consumable for said depleted consumable in said device, authenticating said replacement consumable by entering said code number aggregated with said replacement consumable into said device and, in said device, obtaining an authentication result by checking whether said code number aggregated with said replacement consumable has said relationship to one of said reference code numbers in said reference code number range stored in said device and, if so, consuming said one of said reference code numbers in said device by permanently deleting said one of said reference code numbers from said device; and (i) controlling said device dependent on said authentication result.

36. A method as claimed in claim 35 wherein said event is reactivation of said device after shutdown of said device.

37. A method as claimed in claim 35 wherein said device is a thermal printer and wherein said consumable is a cassette containing a thermal transfer inking ribbon that is transported in said cassette by a first length for printing an image and that is transported by a second length, substantially smaller than said first length, between printing of successive images, and wherein said event is transport of said thermal transfer inking ribbon by said second length.

* * * * *